Patented Jan. 8, 1924.

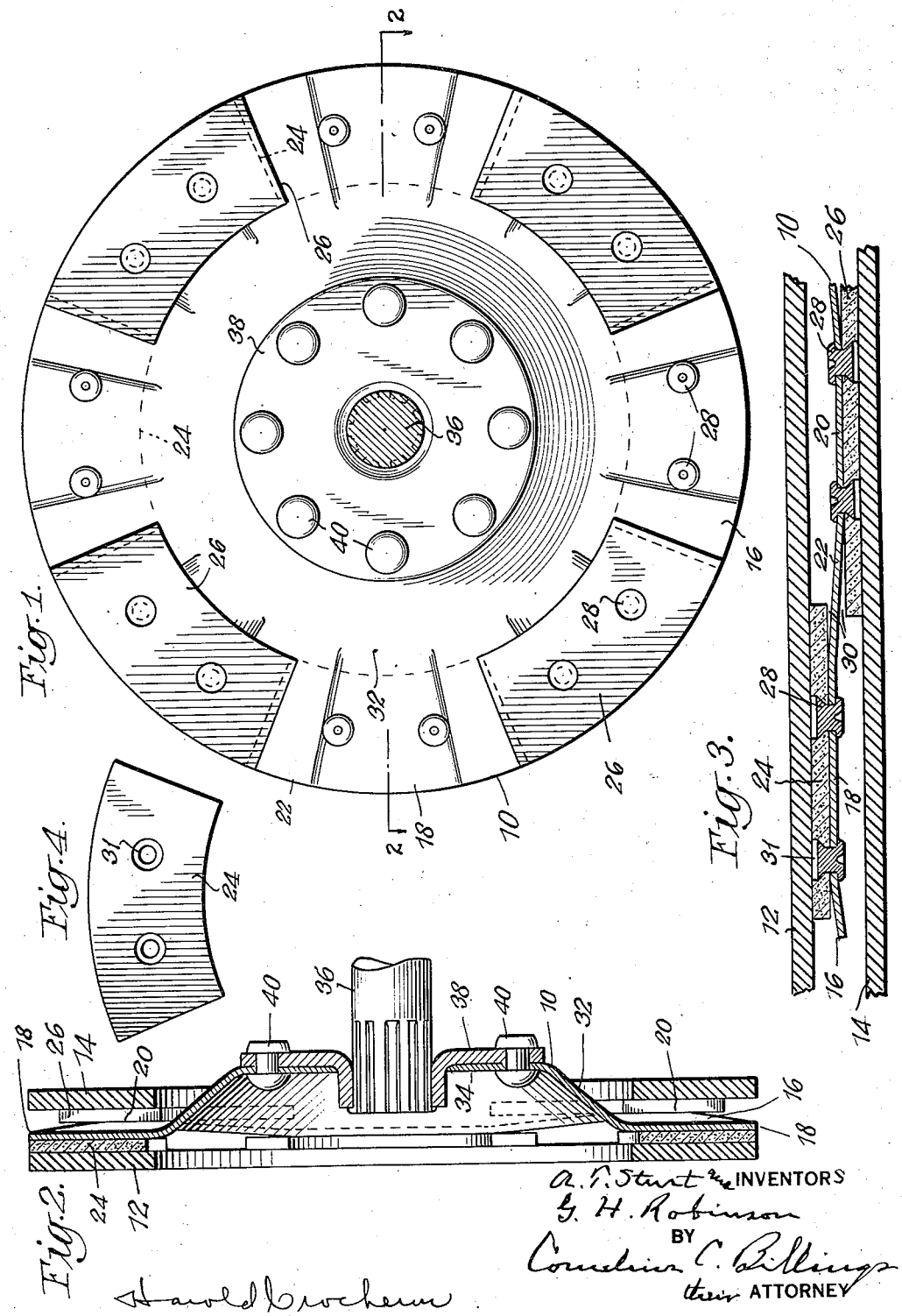

1,479,974

UNITED STATES PATENT OFFICE.

ALFRED T. STURT, OF FLINT, MICHIGAN, AND GEORGE H. ROBINSON, OF NEW YORK, N. Y., ASSIGNORS TO DURANT MOTORS INCORPORATED, A CORPORATION OF DELAWARE.

CLUTCH.

Application filed August 26, 1922. Serial No. 584,475.

*To all whom it may concern:*

Be it known that we, ALFRED T. STURT and GEORGE H. ROBINSON, citizens of the United States, and residents, respectively, of Flint, county of Genesee, State of Michigan, and borough of Manhattan, city and State of New York, have jointly invented certain new and useful Improvements in Clutches, of which the following is a specification.

This invention relates to an improved clutch for use on motor vehicles and similar mechanisms and to an improved clutch plate which permits a cushioned engagement between the driving member and a driven member without the use of numerous and costly parts.

More particularly, the invention relates to a clutch plate suitable for use in clutch assemblies of the type in which the opposite faces of the clutch plate are gripped by pressure plates or surfaces which rotate with and are driven by the drive shaft, a gradual engagement being obtained by providing the clutch plate with a number of slightly resilient pressure receiving surfaces. As the pressure surfaces contact with the clutch plate the peripheral portions of the plate are first engaged with a slight or moderate pressure and with increasingly greater pressure as the pressure receiving surfaces are compressed and flexed to provide a greater contact surface and an increased surface pressure.

An object of the present invention is to provide an improved clutch plate for clutch assemblies of the above type and of a simpler and cheaper construction.

Another object of the invention is to provide a clutch plate having a substantially continuous, resilient pressure surface.

A further object of the invention is to provide a clutch plate having friction mats mounted to exert a slight pressure as the gripping plates first contact with the clutch plate and to contact uniformly with gripping surfaces throughout their contact surface as the plates tightly grip the mats.

A still further object of the invention is to provide a clutch plate having an undulated gripping portion and having friction mats mounted on said undulations in a manner to produce a resilient spring effect between said gripping plates and said clutch plate.

With these and other objects in view the invention comprises the clutch devices described and set forth in the following specification and claims.

The various features of the invention are illustrated in the accompanying drawings, in which:

Fig. 1 is an end view of a clutch plate embodying a preferred form of the invention and of a driven or transmission shaft on which the plate is mounted.

Fig. 2 is a sectional view of the clutch plate and a portion of the transmission shaft, taken in line 2—2 of Fig. 1 and of co-operating pressure or gripping surfaces.

Fig. 3 is a detail sectional view of a portion of the clutch plate shown in Figs. 1 and 2 and the pressure surfaces adapted to co-operate therewith, and Fig. 4 is a detail view of a friction mat.

In the present invention, the clutch plate is formed with a substantially flat portion adapted to be gripped between the gripping plates of the clutch mechanism and to be slightly sprung as the maximum gripping pressure is exerted on the plate. Friction mats or pads are mounted alternately on opposite sides of the clutch plate in such a manner that, as the pressure surfaces, a gripped by the pressure surfaces, a gripping pressure tending to flex or distort the plate alternately in opposite directions is applied at the surfaces on which the friction mats are mounted. The friction mats and clutch plates are so arranged that the adjacent faces of the friction mats and clutch plate normally diverge, or are spaced away, from the surface of the clutch plate toward the radial edges of the mats so as to present a substantially flat surface as the plate is more tightly gripped. This is preferably accomplished by giving the surface of the plate a slightly sinuous or undulating form and attaching the central portion of the friction mats to the crests of the undulations on opposite sides of the plate. As the plate is compressed it is flattened and contacts throughout with the adjacent surfaces of the mats. The clutch plate is connected to a driven or transmission shaft, preferably at its central portion which is of a dished or conoid shape to give the plate the desired strength and stiffness.

Referring more particularly to the accompanying drawings, motion is transmitted from a driving shaft or crank shaft of a motor to a clutch plate 10 by two oppositely disposed pressure plates 12 and 14, Figs. 2 and 3, which rotate with the crank shaft and may be pressed toward each other by any suitable means to contact with, and grip, a substantially flat peripheral portion 16 of the clutch plate 10 positioned between the pressure plate 10 peripheral portion 16 of the plate is formed in an undulating or sinuous form, having crests or sectors 18 and 20 slightly offset alternately on opposite sides of the median plane of the peripheral portion, and joined by intermediate, sloping, connecting portions of sectors 22. The crest sectors 18 and 20 have their outer faces substantially parallel to the surfaces of the gripping rings or plates 12 and 14 and are preferably offset approximately the thickness of the plate. Friction mats 24 and 26 are mounted on the plane outer surfaces of the crests 18 and 20 respectively by means of rivets 28 and are of sufficient length to overlap the sloping connecting portions or sectors 22. The friction mats may be made of compressed or woven asbestos and have plane parallel faces so that when the plate is not compressed and distorted the adjacent faces of the sloping portions 22 of the plates diverge from the adjacent face of the mat, forming slight angles 30 therewith. When the peripheral portion of the plate is compressed between the plates 12 and 14 and the crests of the plate and the inclined connecting portions are pressed into a common plane, the adjacent faces of the mats and plate contact throughout the extent of the mats and exert a uniform pressure on the gripping plates 12 and 14.

The sloping connecting portions or sectors 22 act as spring members between the flat parallel crests 18 and 20 exerting but very little pressure between adjacent crest sectors when these crest sectors are pressed very slightly toward each other and exerting gradually increasing pressure as the sectors are pressed together. Accordingly a cushioning effect is obtained as the clutch is slowly thrown in, a slight slipping and a low tractive effect being obtained as the pressing or gripping plates first contact with the mats and an effective engagement and locking of the plates and mats being obtained with the final gripping action.

The mats 24 and 26 are of sufficient length in a circumferential direction to slightly overlap on opposite faces of the plate, and the rivets 28 are slightly counter-sunk in holes 31 to avoid scraping the pressure rings as the mats wear slightly.

Extending inwardly from the offset or undulating peripheral gripping portion of the plate is a conoid or dished portion 32 joining an inner flat portion 34 parallel with the undulating portion of the plate. The plate is rigidly connected to a driven or transmission shaft 36 by means of a radially extending connecting plate 38 to which the plate is connected by means of rivets 40.

The plate may be made of thin material since the spring effect of the sloping connecting portions is proportionally much stronger. The plate may be formed by blanking out of sheet stock, piercing the holes for the rivets, and then pressing the peripheral portion into the proper undulating form, and, if necessary, finishing the crest sectors to make them parallel. This provides a very simple and inexpensive construction providing a clutch plate having the desired cushioning effect and enables an easily formed inexpensive type of friction mats to be used.

Having thus described our invention what we claim as new and desire to secure by Letters Patent is:

1. A device of the kind described which comprises a plate having a substantially flat portion, friction mats mounted alternately on opposite faces of said plate to distort said plate as pressure is applied to said mats in opposite directions.

2. A device of the kind described which comprises, a plate having a substantially flat portion and friction mats mounted alternately on opposite faces of said plate to distort said plate as pressure is applied to said mats in opposite directions, the adjacent surfaces of said plate and mats diverging toward the radial edges of said mats and pressed into contact when said plate is tightly gripped.

3. A device of the kind described which comprises a plate having a substantially flat peripheral portion, said portion having a slightly undulated surface and friction mats mounted on the crests of said undulations on opposite sides of the plate.

4. A device of the kind described which comprises a plate having a substantially flat peripheral portion, said portion having a slightly undulated surface forming sectors parallel and slightly offset relatively to each other and connecting sloping sectors, and friction mats mounted on the crest portions of said offset sectors and extending over said sloping sectors.

5. A device of the kind described which comprises, a plate having a substantially flat portion and friction mats mounted alternately on opposite sides of said plate having a central portion of each mat contacting with the plate and diverging from the plate toward the radial edges.

6. A device of the kind described which comprises, a circular plate having a substantially flat peripheral portion and a central conoidal portion, said flat peripheral portion having a succession of radial undulations, the crests of said undulations being substantially flat and parallel to each other and friction mats mounted on successive crests on opposite sides of said plate and extending over the non-parallel portions of said plate.

7. A device of the kind described which comprises, a driven shaft, and a clutch plate having a substantially flat peripheral portion and a conoidal portion connecting said flat peripheral portion to said shaft, said peripheral portion having friction mats mounted alternately on opposite faces of said plate to distort said plate as pressure is applied to said mats in opposite directions, the adjacent surfaces of said plate and mats diverging toward the radial edges of said mats and pressed into contact when said plate is tightly gripped.

8. A device of the kind described which comprises, a clutch plate having a peripheral gripping portion, said gripping portion having flat friction surfaces each of constant frictional area alternately offset in opposite directions from and parallel to an intermediate plane and sloping portions connecting said flat friction surfaces adapted to be compressed as the flat surfaces are compressed into a single plane.

In witness whereof we have hereunto set our hands at Long Island City, county of Queens, State of New York, this 25th day of August, 1922.

ALFRED T. STURT.
GEORGE H. ROBINSON.